US011845908B2

(12) United States Patent
Liu et al.

(10) Patent No.: US 11,845,908 B2
(45) Date of Patent: Dec. 19, 2023

(54) METHOD FOR PREPARING FUNCTIONAL GREASE THROUGH SEGMENTED SOLID-STATE FERMENTATION OF MIXED FUNGI

(71) Applicant: Jiangnan University, Wuxi (CN)

(72) Inventors: Yuanfa Liu, Wuxi (CN); Jinwei Li, Wuxi (CN); Yinghong Zhai, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 842 days.

(21) Appl. No.: 16/916,448

(22) Filed: Jun. 30, 2020

(65) Prior Publication Data

US 2020/0332220 A1   Oct. 22, 2020

Related U.S. Application Data

(63) Continuation of application No. PCT/CN2019/126885, filed on Dec. 20, 2019.

(30) Foreign Application Priority Data

Dec. 21, 2018   (CN) .......................... 201811569022.4

(51) Int. Cl.
*C11B 1/04*   (2006.01)
*A23L 31/15*   (2016.01)
*A23D 9/007*   (2006.01)
(Continued)

(52) U.S. Cl.
CPC ................ *C11B 1/04* (2013.01); *A23D 9/007* (2013.01); *A23D 9/04* (2013.01); *A23D 9/06* (2013.01);
(Continued)

(58) Field of Classification Search
CPC ......... C11B 1/04; C11B 1/104; C11B 5/0042; C11B 1/025; C11B 5/0035; C11B 1/00;
(Continued)

(56) References Cited

FOREIGN PATENT DOCUMENTS

| CN | 101560440 A | 10/2009 |
| CN | 102002428 A | 4/2011 |

(Continued)

OTHER PUBLICATIONS

PCT/CN2019/126885 ISR dated Feb. 26, 2020.
(Continued)

*Primary Examiner* — Deborah D Carr
(74) *Attorney, Agent, or Firm* — IPRO, PLLC; Na Xu

(57) ABSTRACT

The disclosure discloses a method for preparing functional grease through segmented solid-state fermentation of mixed fungi, and belongs to the field of edible oil processing. According to the disclosure, soybeans are used as a main fermentation substrate, for the requirements for different functional nutrition, the soybeans are matched with other oil seeds, fungus segmented solid-state fermentation is used and combined with a supercritical extraction fractionation technology, so that the purposes of improving the aftertaste of soybean oils and generating different flavors are achieved, and the nutritional value of the grease is improved. The fungus segmented solid-state fermentation of the disclosure can improve the oil yield, improve the fatty acid composition of the grease, and increase the content of main flavor substances such as pyrazines, alcohols and phenols, and the sensory functions such as flavor and color of the grease more meet the requirements of consumers for innovative products. Fermented dregs can be further processed to produce byproducts like functional polypeptides, so that sustainable green development is realized.

17 Claims, 1 Drawing Sheet

(51) Int. Cl.
    *A23D 9/04*     (2006.01)
    *A23D 9/06*     (2006.01)
    *C11B 1/10*     (2006.01)
    *C11B 5/00*     (2006.01)

(52) U.S. Cl.
    CPC .............. *A23L 31/15* (2016.08); *C11B 1/104* (2013.01); *C11B 5/0042* (2013.01); *A23V 2002/00* (2013.01)

(58) Field of Classification Search
    CPC .. C11B 3/12; A23D 9/007; A23D 9/04; A23D 9/06; A23D 9/02; A23L 31/15; A23L 11/07; A23L 27/72; A23L 33/105; A23L 33/115; A23L 33/135; A23L 33/14; A23V 2002/00; Y02P 20/54
    See application file for complete search history.

(56) References Cited

FOREIGN PATENT DOCUMENTS

| CN | 102787013 A | | 11/2012 |
|---|---|---|---|
| CN | 102807915 A | * | 12/2012 |
| CN | 102807915 A | | 12/2012 |
| CN | 103173274 A | | 6/2013 |
| CN | 103333739 A | * | 10/2013 |
| CN | 103333739 A | | 10/2013 |
| CN | 109022119 A | | 12/2018 |
| CN | 109536268 A | | 3/2019 |
| EP | 3134098 A | | 3/2017 |
| JP | 2007129985 A | | 5/2007 |

OTHER PUBLICATIONS

Lin, Jintao et. al., Microbial lipid production by Rhodosporidium toruloides in a two-stage culture mode, cHIN J Biotech, Jul. 25, 2010, 26(7) 997-1002.

Yu, Yan et. al, Production of soybean oil by microbial fermentation and optimization of fermentation production conditions, Science and Technology of Food Industry, vol. 33, No. 14, 2012.

Xiang, Guangming et. al., Research advance of microbial oils, Cereals and Oils Processing, Aug. 2009, vol. 09 p. 56-60.

Niu, Xiaojuan et. al.,A Preliminary Study on the High-efficiency Oil Extraction of Soybeans Pretreated by Fungal Solid State Fermentation,Cereals and Oils Processing, 2009 vol. 10, p. 50.

* cited by examiner

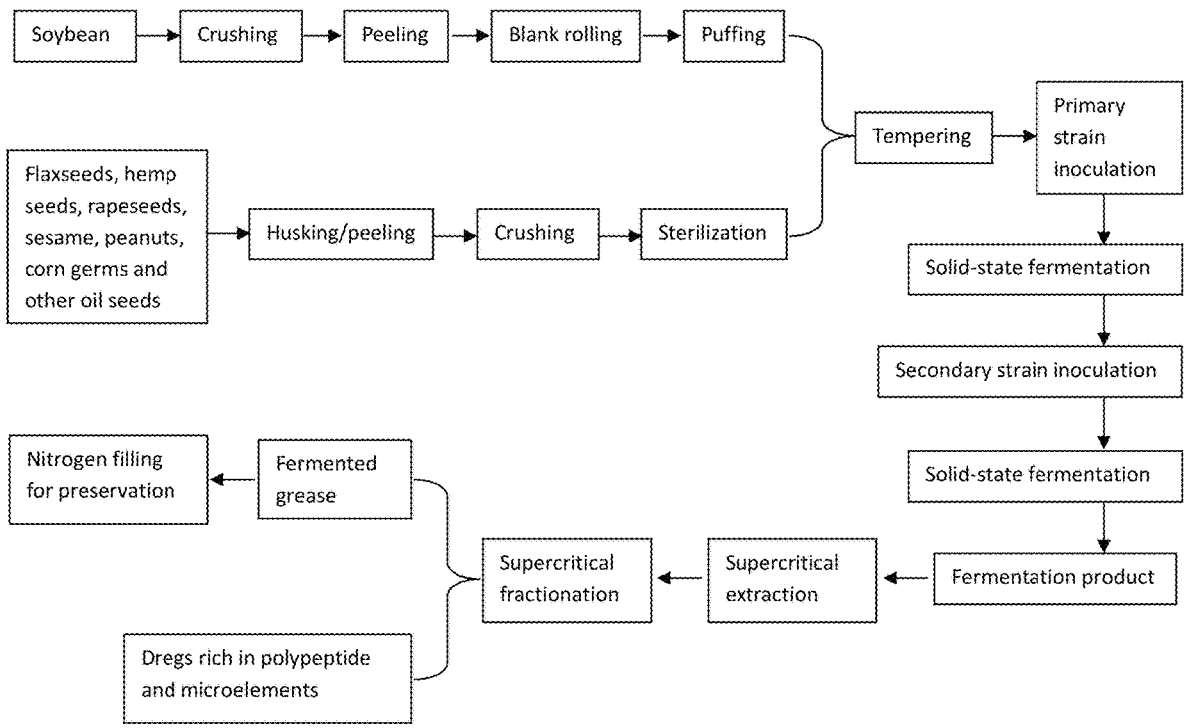

METHOD FOR PREPARING FUNCTIONAL GREASE THROUGH SEGMENTED SOLID-STATE FERMENTATION OF MIXED FUNGI

TECHNICAL FIELD

The disclosure relates to a method for preparing functional grease through segmented solid-state fermentation of mixed fungi, and belongs to the field of processing of edible oils.

BACKGROUND

A soybean oil is the most output vegetable oil in the world. Traditional methods for preparing the soybean oil include a squeezing method and an extracting method. The squeezing method mainly uses a spiral oil press for squeezing. The soybean oil obtained by squeezing can retain an original flavor and nutritional components, but the squeezing method has strict requirements for raw material selection and a problem of low oil yield, which will greatly increase the production cost of the soybean oil. The principle of the extracting method is that the soybean oil is extracted by an organic solvent, and refining processes such as high-temperature deodorization are required in the process of the principle, so that nutritional components in the oil are damaged, and the later refining requirement is high. The prior art also discloses an aqueous enzymatic method used for extracting oil, although the aqueous enzymatic method is more environmentally friendly and high in raw material utilization rate, the requirement for equipment is relatively high, and in addition, the aqueous enzymatic method cannot be developed and applied on a large scale due to difficulty in oil-water separation.

With the development of science and technology, solid-state fermentation has attracted much attention of people due to unique advantages (such as without "three wastes" emission). Solid-state fermentation refers to a fermentation process in which a natural substrate is used as a carbon source and an energy source, or an inert substrate is used as a solid support, and a system is nearly anhydrous. The prior art discloses a technology combining solid-state fermentation with the aqueous enzymatic method or a cold pressing method to ferment soybeans or sesame, an oil yield can be improved, but the research on solid-state fermentation is relatively few at present, especially the research on the influence of different bacterial strains on the process needs further exploration and improvement, and finding proper bacterial strains is the key to influence the oil extraction effect and the quality of byproducts.

Functional grease is a kind of grease with nutrition and health care functions to the human body, and has not only a good sensory function (flavor and appearance) but also a higher nutrition function. With the development of society and the improvement of people's living standard, more and more people pursue healthy life, and the functional grease has become more and more people's favor. In order to meet the demand of consumers for the functional grease on the market, a series of blend oils are derived and fat-soluble vitamins, phenols, sterols and other substances are added into a primary oil. Edible blend oils are edible oils prepared by blending two or more kinds of vegetable grease in proportion. At present, the concept of the blend oils is relatively fuzzy on the market, and before the national standard of the blend oils is promulgated, the fatty acid composition and beneficial accompaniments of the blend oils are not strictly limited. In order to earn profits, many merchants whoop it up on the concept of the blend oils, and the phenomena of low for high, shoddy goods for quality goods and so on often occur.

Therefore, there is an urgent need to find a green and efficient method for producing the functional grease in order to meet the demand for the functional grease on the market.

SUMMARY

The technical problems to be solved by the disclosure are to provide grease capable of meeting the pursuit of consumers to innovative grease products, grease flavor, color and functionality and a preparation method thereof, and to improve the comprehensive utilization rate of resources simultaneously.

In order to achieve the abovementioned purpose, the technical solution provided by the disclosure is to synthesize a fungus segmented solid-state fermentation technology and a supercritical extraction fractionation technology to prepare different functional grease required by different crowds, and particularly, the disclosure provides a method for preparing functional grease through segmented solid-state fermentation of mixed fungi. The method includes the following steps:

(1) power preparation: after crushing and peeling soybeans, rolling a blank, performing puffing by using a hydraulic conical plug puffing machine with a puffing temperature of 150-160° C. and puffing time of 1-3 min, and then cooling to 25-35° C. to obtain soybean powder; husking or peeling other oil seeds, crushing into 50-100 meshes, autoclaving crushed powder at 115-121° C. for 15-30 min, and cooling to 25-35° C. to obtain other oil seed powder;

(2) fungus fermentation: mixing the puffed soybean powder and the other oil seed powder subjected to autoclaving at a ratio of 6-9:1-4 (W/W), putting a mixture into a fermentation tank, adjusting moisture content of materials in the fermentation tank to be 20-30 wt %, adding 0.5-5 wt % of glucose, adding 0.05-0.5 wt % of NaCl, adjusting pH to be 3.5-9, inoculating 10-20 wt % of fungal strains, and performing segmented fermentation with a fermentation temperature of 25-35° C. and fermentation time of 3-7 d;

(3) supercritical $CO_2$ extraction fractionation: transferring a fermentation product into an extraction kettle, performing supercritical $CO_2$ extraction, then performing reduced pressure fractionation to prepare nutrition-enhanced grease with different flavors and colors, and filling the grease with nitrogen so as to preserve the grease under an inert gas environment;

wherein the fungi are mold or yeast, the mold includes *Aspergillus oryzae, Aspergillus niger* and *Mortierella isabellina*, and the yeast includes *Rhodotorula glutinis, Candida albicans* and *Rhodosporidium toruloides*; and the segmented fermentation is as follows: when the fungi are the mold, the pH is adjusted to be 3.5-9, a dissolved oxygen amount is adjusted to be 30%-40% of a total material volume, firstly the *Aspergillus oryzae* is added for fermentation for 1-3 d, then 0.1-1 wt % of glucose is replenished, the pH is adjusted to be 3.5-9, the dissolved oxygen amount is adjusted to be 30%-40% of the total material volume, and then the *Aspergillus niger* and the *Mortierella isabellina* are added for culture for 2-6 d; or, when the fungi are the yeast, the pH is adjusted to be 5-9, the dissolved oxygen amount is adjusted to be 25%-35% of the total material volume, firstly the *Candida albicans* or the *Candida albicans* and the *Rhodosporidium toruloides* are added for fermentation for 2-5 d, then 1 wt %-3 wt % of glucose is replenished, the pH is adjusted to be 5-9, the dissolved oxygen amount is adjusted to be 10%-20% of the total material volume, and then the *Rhodotorula glutinis* and the *Rhodosporidium toruloides* or the *Rhodotorula glutinis* is added for fermentation for 1-4 d.

In one implementation of the disclosure, the other oil seeds are any one or more of flaxseeds, hemp seeds, rapeseeds, sesame, peanuts and corn germs.

In one implementation of the disclosure, a mass ratio of the *Aspergillus oryzae* to the *Aspergillus niger* to the *Mortierella isabellina* is 1-5:1-5:1-5.

In one implementation of the disclosure, a mass ratio of the *Rhodotorula glutinis* to the *Candida albicans* to the *Rhodosporidium toruloides* is 1-5:1-5:1-5.

In one implementation of the disclosure, extraction pressure is 30-40 MPa, a $CO_2$ flow rate is 15-20 L/h, an extraction temperature is 40-50° C., and extraction time is 1.5-2 h.

In one implementation of the disclosure, the reduced pressure fractionation is divided into primary reduced pressure fractionation and secondary reduced pressure fractionation, the primary reduced pressure fractionation has the pressure of 10-20 MPa and the temperature of 40-50° C., and the secondary reduced pressure fractionation has the pressure of 8-10 MPa and the temperature of 35-45° C.

The disclosure has the beneficial effects:

(1) according to the disclosure, the mixed fungus fermentation technology is innovatively utilized, 2-amylfuran which is the main beany flavor producing substance is metabolized through an enzyme produced by the fungi in the process of powder growth metabolism, and the other oil seeds such as the flaxseeds, the hemp seeds, the rapeseeds and the peanuts are added for fermentation together to increase the content of flavor substances such as pyrazines and alcohols in the grease so as to improve the flavor of the grease; and the *Rhodotorula glutinis* and the *Rhodosporidium toruloides* adopted by the disclosure are fermented to prepare the grease, so that the grease is endowed with a bright red color, and the desire of consumers for innovative products can be met;

(2) according to the method of the disclosure, the fatty acid composition of the grease is improved from the source through the mixed fungus fermentation, high-added-value fatty acids (γ-linolenic acid, arachidonic acid, eicosapentaenoic acid, docosahexaenoic acid and the like) are obtained, the content of unsaturated fatty acids of the grease prepared by the method can reach up to 84%, and nutritional factors in the grease can be reserved to the greatest extent by the method, for example, a retention rate of a natural antioxidant can reach 90%;

(3) according to the disclosure, the soybeans are puffed by using the hydraulic conical plug puffing machine, and the heat treatment mode has little negative influence on soybean oil nutrient substances, especially on the quality of proteins; and anti-nutritional factors can be inactivated, microbial pollution is reduced, and energy consumption during autoclaving is reduced; by utilizing the supercritical extraction technology, green and environment-friendly production can be realized, and the generation of chemical pollution is reduced; and dregs generated after the mixed fungus fermentation may contain a large amount of functional polypeptides, and the dregs can be further processed deeply, so that the added value of the product is improved;

(4) according to the method of the disclosure, through the segmented solid-state fermentation of the mixed fungi, the oil yield of crops is greatly increased, the maximum oil yield can reach 95.0%, the oil yield is increased by 40-60% compared with that of an oil extraction mode without fungus solid-state fermentation, and the oil yield is increased by 18-27% compared with that of single strain fermentation; and (5) the disclosure can prepare the nutrition-enhanced grease with different flavors and colors, and can meet the requirements of consumers for innovative grease products, and pursuit of the grease flavor, color and functionality, so that the green and environment-friendly production is realized, and meanwhile, the comprehensive utilization rate of resources is improved.

BRIEF DESCRIPTION OF FIGURES

FIG. 1 is a schematic diagram of a method for preparing functional grease through segmented solid-state fermentation of mixed fungi.

DETAILED DESCRIPTION

Oil yield (%)=(grease content in original powder-grease content in powder dregs)/grease content in the original powder*100%.

A method for measuring content of unsaturated fatty acids refers to GB 5009.168-2016.

Retention rate of beneficial accompaniments in grease: 1-(content of beneficial accompaniments in grease obtained by Soxhlet extraction-content of beneficial accompaniments in fermentation supercritical oil extraction)/content of beneficial accompaniments in the grease obtained by Soxhlet extraction*100%.

A method for measuring relative content of pyrazines, alcohols and phenols refers to the prior art (Xu Yuehua, Study on Flavor Enhancement of Cold-pressed Walnut Oil and Walnut Milk Stability [D]. Jiangnan University, 2014.), the relative content of the pyrazines, the alcohols and the phenols in the grease is detected by adopting headspace solid-phase micro-extraction-gas chromatography-mass spectrometry (HS-SPME-GC/MS), and the calculation method includes:

main flavor substance content/total flavor substance content*100%.

Mold Activation:

*Aspergillus oryzae*: the *Aspergillus oryzae* is inoculated in a potato culture solution, and subjected to shaking culture for 2 d under the conditions of 180 rpm and 35° C.;

*Aspergillus niger*: the *Aspergillus niger* is inoculated in a seed culture medium containing 3 wt % of glucose, 0.2 wt % of magnesium sulfate and 0.2 wt % of monopotassium phosphate, and cultured at 180 rpm and 28° C. for 2 d; and

*Mortierella isabellina*: the *Mortierella isabellina* is inoculated in a potato culture solution and cultured at 180 rpm and 28° C. for 2 d by adding 0.05 wt % of glucose, 0.005 wt % of monopotassium phosphate and 0.015 wt % of magnesium sulfate.

Yeast Activation:

*Rhodotorula glutinis*: the *Rhodotorula glutinis* is inoculated in a culture medium containing 4 wt % of glucose, 0.3 wt % of yeast powder, 0.2 wt % of ammonium sulfate, 0.7 wt % of monopotassium phosphate and 0.15 wt % of magnesium sulfate, and subjected to shaking culture for 6 d under the conditions of 180 rpm and 30° C.;

*Candida albicans*: the *Candida albicans* is inoculated in a culture medium containing 2 wt % of glucose, 0.5 wt % of yeast powder and 0.8 wt % of peptone, and subjected to shaking culture for 4 d under the conditions of 180 rpm and 30° C.; and

*Rhodosporidium toruloides*: the *Rhodosporidium toruloides* is inoculated in a culture medium containing 7 wt % of glucose, 0.01 wt % of ammonium sulfate, 0.05 wt % of yeast powder, 0.04 wt % of monopotassium phosphate and 0.15 wt % of magnesium sulfate, and subjected to shaking culture for 6 d under the conditions of 180 rpm and 30° C.

Embodiment 1

(1) Powder Preparation

After soybeans are crushed and peeled and a blank is rolled, powder is puffed by using a hydraulic conical plug puffing machine with a puffing temperature of 150° C. and puffing time of 2 min, and then cooled to 35° C.; and flaxseeds are crushed into 100 meshes, autoclaved at 121° C. for 15 min, and cooled to 28° C.

(2) Mixed Fungus Fermentation

The puffed soybean powder and the flaxseed powder subjected to autoclaving are mixed at a ratio of 8:2 (W/W), and transferred into a fermentation tank, moisture content is adjusted to be 20 wt %, 1 wt % of glucose is added, 0.05 wt % of NaCl is added, pH is adjusted to be about 5.0, and a dissolved oxygen amount is adjusted to be 30% of a total material volume; *Aspergillus oryzae* is added into the fermentation tank with an inoculating amount of 10% (W, hereinafter inclusive), a fermentation temperature of 35° C. and fermentation time of 2 d; and the temperature in the fermentation tank is reduced to be 28° C. after 2 d, 0.5 wt % of glucose is replenished, and *Aspergillus niger* and *Mortierella isabellina* are mixed and added into the fermentation tank at a ratio of 1:1 with a total inoculating amount of 10%, the natural pH, the dissolved oxygen amount of 40% of the total material volume, the fermentation temperature of 28° C. and the fermentation time of 5 d.

(3) Supercritical $CO_2$ Extraction Fractionation

A fermentation product is transferred into an extraction kettle with extraction pressure of 30 MPa, a $CO_2$ flow rate of 15 L/h, an extraction temperature of 45° C., and extraction time of 2 h, then reduced pressure fractionation including primary reduced pressure fractionation with pressure of 15 MPa and a temperature of 40° C. and secondary reduced pressure fractionation with pressure of 8 MPa and a temperature of 35° C. is performed, and prepared nutrition-enhanced functional grease is filled with nitrogen for preservation.

The method of the segmented solid-state fermentation of mixed fungi is used for preparing the grease, an oil yield is 91.7%, the content of unsaturated fatty acids such as linoleic acid, linolenic acid and arachidonic acid is 79.5%, beneficial accompaniments such as vitamin E, tocopherol and other natural antioxidants in the grease are retained to the maximum extent, the retention rate is 92.0%, the relative content of main flavor substances such as pyrazines, alcohols and phenols in the grease is 30.8%, and the flavor of soybean grease is improved.

Embodiment 2

(1) Powder Preparation

After soybeans are crushed and peeled and a blank is rolled, powder is puffed by using a hydraulic conical plug puffing machine with a puffing temperature of 160° C. and puffing time of 2 min, and then cooled to 30° C.; and flaxseeds are crushed into 100 meshes, autoclaved at 121° C. for 15 min, and cooled to 30° C.

(2) Mixed Fungus Fermentation

The puffed soybean powder and the flaxseed powder subjected to autoclaving are mixed at a ratio of 8:2 (W/W), and transferred into a fermentation tank, moisture content is adjusted to be 20 wt %, 5 wt % of glucose is added, 0.1 wt % of NaCl is added, pH is adjusted to be 6.2, a dissolved oxygen amount is adjusted to be 30% of a total material volume, and *Candida albicans* and *Rhodosporidium toruloides* are mixed and inoculated the into the fermentation tank at a ratio of 1:1 (W/W) with an inoculating amount of 10%, a fermentation temperature of 30° C. and fermentation time of 3 d; and the fermentation temperature is reduced to be 28° C. after 3 d, 2 wt % of glucose is replenished, the dissolved oxygen amount is adjusted to be 15% of the total material volume, the pH is adjusted to be 6.0, and 10% of *Rhodotorula glutinis* is inoculated with the fermentation temperature of 28° C. and the fermentation time of 4 d.

(3) Supercritical $CO_2$ Extraction Fractionation

A fermentation product is transferred into an extraction kettle with extraction pressure of 30 MPa, a $CO_2$ flow rate of 15 L/h, an extraction temperature of 40° C., and extraction time of 1.5 h, primary reduced pressure fractionation has pressure of 10 MPa and a temperature of 40° C., secondary reduced pressure fractionation has pressure of 8 MPa and a temperature of 35° C., and prepared functional grease with different flavors and colors is filled with nitrogen for preservation.

The method of the segmented solid-state fermentation of mixed fungi is used for preparing the grease, an oil yield is 94.6%, change of the fatty acid composition is not obvious, the flavor of the grease is greatly improved along with a yeast fermentation reaction, the relative content of main flavor substances such as pyrazines, alcohols and phenols in the grease is 34.9%, the color of the grease is slight red, the grease is bright, beneficial accompaniments such as vitamin E, tocopherol and other natural antioxidants in the grease are retained to the maximum extent, and the retention rate is 90.1%.

Embodiment 3

(1) Powder Preparation

After soybeans are crushed and peeled and a blank is rolled, powder is puffed by using a hydraulic conical plug puffing machine with a puffing temperature of 160° C. and puffing time of 1 min, and then cooled to 35° C.; and hemp seeds are hulled and crushed into 100 meshes, autoclaved at 121° C. for 15 min, and cooled to 35° C.

(2) Mixed Fungus Fermentation

The puffed soybean powder and the hemp seed powder subjected to autoclaving are mixed at a ratio of 9:1 (W/W), and transferred into a fermentation tank, moisture content is adjusted to be 25 wt %, 5 wt % of glucose is added, 0.05 wt % of NaCl is added, pH is adjusted to be about 5.0, and a dissolved oxygen amount is adjusted to be 40% of a total material volume; *Aspergillus oryzae* is added into the fermentation tank with an inoculating amount of 8% (W), a fermentation temperature of 35° C. and fermentation time of 2 d; and the temperature in the fermentation tank is reduced to be 28° C. after 2 d, 0.1 wt % of glucose is replenished, and *Aspergillus niger* and *Mortierella isabellina* are mixed and added into the fermentation tank at a ratio of 1:3 with a total inoculating amount of 8%, the natural pH, the dissolved oxygen amount of 30% of the total material volume, the fermentation temperature of 28° C. and the fermentation time of 5 d.

(3) Supercritical $CO_2$ Extraction Fractionation

A fermentation product is transferred into an extraction kettle with extraction pressure of 40 MPa, a $CO_2$ flow rate of 20 L/h, an extraction temperature of 50° C., and extraction time of 2 h, primary reduced pressure fractionation has pressure of 20 MPa and a temperature of 50° C., secondary reduced pressure fractionation has pressure of 10 MPa and a temperature of 45° C., and prepared nutrition-enhanced functional grease with a good flavor is filled with nitrogen for preservation.

The method of the segmented solid-state fermentation of mixed fungi is used for preparing the grease, an oil yield is 89.3%, the content of unsaturated fatty acids such as linoleic acid, linolenic acid and arachidonic acid is 84.3%, beneficial accompaniments such as vitamin E, tocopherol and other natural antioxidants in the grease are retained to the maximum extent, the retention rate is 90.6%, through the flavor of the hemp seed grease and a fermentation effect, the relative content of main flavor substances such as pyrazines, alcohols and phenols in the fermented grease is 48.7%, and the "aftertaste" of a soybean oil completely disappears.

Embodiment 4

(1) Powder Preparation

After soybeans are crushed and peeled and a blank is rolled, powder is puffed by using a hydraulic conical plug puffing machine with a puffing temperature of 160° C. and puffing time of 1 min, and then cooled to 30° C.; and hemp seeds are crushed into 100 meshes, autoclaved at 121° C. for 15 min, and cooled to 30° C.

(2) Mixed Fungus Fermentation

The puffed soybean powder and the hemp seed powder subjected to autoclaving are mixed at a ratio of 9:1 (W/W), and transferred into a fermentation tank, moisture content is adjusted to be 25 wt %, 4 wt % of glucose is added, 0.2 wt % of NaCl is added, pH is adjusted to be 6.2, a dissolved oxygen amount is adjusted to be 30% of a total material volume, and *Candida albicans* and *Rhodosporidium toruloides* are mixed and inoculated the into the fermentation tank at a ratio of 1:1 (W/W) with an inoculating amount of 8%, a fermentation temperature of 30° C. and fermentation time of 3 d; and the fermentation temperature is reduced to be 28° C. after 3 d, 3 wt % of glucose is replenished, the dissolved oxygen amount is adjusted to be 10% of the total material volume, the pH is adjusted to be 6.0, and 10% of *Rhodotorula glutinis* is inoculated with the fermentation temperature of 28° C. and the fermentation time of 4 d.

(3) Supercritical $CO_2$ Extraction Fractionation

A fermentation product is transferred into an extraction kettle with extraction pressure of 35 MPa, a $CO_2$ flow rate of 15 L/h, an extraction temperature of 45° C., and extraction time of 2 h, primary reduced pressure fractionation has pressure of 20 MPa and a temperature of 40° C., secondary reduced pressure fractionation has pressure of 8 MPa and a temperature of 40° C., and prepared nutrition-enhanced functional grease with different flavors and colors is filled with nitrogen for preservation.

The method of the segmented solid-state fermentation of mixed fungi is used for preparing the grease, an oil yield is 22.1%, change of the fatty acid composition is not obvious, the flavor of the grease is greatly improved along with a yeast fermentation reaction, the relative content of main flavor substances such as pyrazines, alcohols and phenols in the fermented grease is 49.5%, the color of the grease is dark red, the grease is bright, beneficial accompaniments such as vitamin E, phenolic substances like tocopherol, and phytosterol in the grease are retained to the maximum extent, and the retention rate is 91.6%.

Embodiment 5

(1) Powder Preparation

After soybeans are crushed and peeled and a blank is rolled, powder is puffed by using a hydraulic conical plug puffing machine with a puffing temperature of 150° C. and puffing time of 3 min, and then cooled to 35° C.; and peanuts are peeled and crushed into 150 meshes, autoclaved at 115° C. for 30 min, and cooled to 35° C.

(2) Mixed Fungus Fermentation

The puffed soybean powder and the peanut powder subjected to autoclaving are mixed at a ratio of 8:2 (W/W), and transferred into a fermentation tank, moisture content is adjusted to be 30 wt %, 3 wt % of glucose is added, 1 wt % of NaCl is added, pH is adjusted to be about 5.0, and a dissolved oxygen amount is adjusted to be 40% of a total material volume; *Aspergillus oryzae* is added into the fermentation tank with an inoculating amount of 8% (W), the fermentation temperature of 35° C. and the fermentation time of 2 d; and the temperature in the fermentation tank is reduced to be 28° C. after 2 d, 0.1 wt % of glucose is replenished, and *Aspergillus niger* and *Mortierella isabellina* are mixed and added into the fermentation tank at a ratio of 1:3 with a total inoculating amount of 8%, the natural pH, the dissolved oxygen amount of 30% of the total material volume, the fermentation temperature of 28° C. and the fermentation time of 5 d.

(3) Supercritical $CO_2$ Extraction Fractionation

A fermentation product is transferred into an extraction kettle with extraction pressure of 30 MPa, a $CO_2$ flow rate of 20 L/h, an extraction temperature of 45° C., and extraction time of 2 h, primary reduced pressure fractionation has pressure of 15 MPa and a temperature of 40° C., secondary reduced pressure fractionation has pressure of 8 MPa and a temperature of 35° C., and prepared nutrition-enhanced functional grease with a good flavor is filled with nitrogen for preservation.

The method of the segmented solid-state fermentation of mixed fungi is used for preparing the grease, an oil yield is 94.9%, the content of unsaturated fatty acids such as linoleic acid, linolenic acid and arachidonic acid is 80.5%, beneficial accompaniments such as vitamin E, tocopherol, triterpenes and flavonoid in the grease are retained to the maximum extent, the retention rate is 84.5%, through combined action of the flavor of a peanut oil and fermentation, the aftertaste of a soybean oil can be improved, and the relative content of main flavor substances such as pyrazines, alcohols and phenols in the fermented grease is 20.9%.

Embodiment 6

(1) Powder Preparation

After soybeans are crushed and peeled and a blank is rolled, powder is puffed by using a hydraulic conical plug puffing machine with a puffing temperature of 150° C. and puffing time of 3 min, and then cooled to 28° C.; and peanuts are peeled and crushed into 150 meshes, autoclaved at 115° C. for 30 min, and cooled to 30° C.

(2) Mixed Fungus Fermentation

The puffed soybean powder and the peanut powder subjected to autoclaving are mixed at a ratio of 8:2 (W/W), and transferred into a fermentation tank, moisture content is adjusted to be 25 wt %, 5 wt % of glucose is added, 0.2 wt % of NaCl is added, pH is adjusted to be 6.2, a dissolved oxygen amount is adjusted to be 30% of a total material volume, and *Candida albicans* is inoculated into the fermentation tank with an inoculating amount of 8%, a fermentation temperature of 30° C. and fermentation time of 4 d; and the fermentation temperature is reduced to be 28° C. after 4 d, 3 wt % of glucose is replenished, the dissolved oxygen amount is adjusted to be 20% of the total material volume, the pH is adjusted to be 5.8, and *Rhodosporidium toruloides* and *Rhodotorula glutinis* are mixed and inoculated into the fermentation tank at a ratio of 1:1 with a total inoculating amount of 10%, the fermentation temperature of 28° C. and the fermentation time of 3 d.

(3) Supercritical $CO_2$ Extraction Fractionation

A fermentation product is transferred into an extraction kettle with extraction pressure of 30 MPa, a $CO_2$ flow rate of 15 L/h, an extraction temperature of 40° C., and extraction time of 1.5 h, primary reduced pressure fractionation has pressure of 10 MPa and a temperature of 40° C., secondary reduced pressure fractionation has pressure of 8 MPa and a temperature of 35° C., and prepared nutrition-enhanced functional grease with a good flavor and color is filled with nitrogen for preservation.

The method of the segmented solid-state fermentation of mixed fungi is used for preparing the grease, an oil yield is 95.0%, beneficial accompaniments such as vitamin E, tocopherol, triterpenes and flavonoid in the grease are retained to the maximum extent, the retention rate is 83.9%, through combined action of the flavor of a peanut oil and fermentation, the relative content of main flavor substances such as pyrazines, alcohols and phenols in the fermented grease is 18.7%, and the grease is red and has good transparency.

Embodiment 7

(1) Powder Preparation

After soybeans are crushed and peeled and a blank is rolled, powder is puffed by using a hydraulic conical plug puffing machine with a puffing temperature of 160° C. and puffing time of 2 min, and then cooled to 28° C.; and rapeseeds are peeled and crushed into 50 meshes, autoclaved at 121° C. for 15 min, and cooled to 28° C.

(2) Mixed Fungus Fermentation

The puffed soybean powder and the rapeseed powder subjected to autoclaving are mixed at a ratio of 3:2 (W/W), and transferred into a fermentation tank, moisture content is adjusted to be 25 wt %, 1 wt % of glucose is added, 0.05 wt % of NaCl is added, pH is adjusted to be about 5.0, and a dissolved oxygen amount is adjusted to be 30% of a total material volume; *Aspergillus oryzae* is added into the fermentation tank with an inoculating amount of 10% (W), a fermentation temperature of 35° C. and fermentation time of 2 d; and the temperature in the fermentation tank is reduced to be 28° C. after 2 d, 0.5 wt % of glucose is replenished, and *Aspergillus niger* and *Mortierella isabellina* are mixed and added into the fermentation tank at a ratio of 1:1 with a total inoculating amount of 10%, the natural pH, the dissolved oxygen amount of 40% of the total material volume, the fermentation temperature of 28° C. and the fermentation time of 5 d.

(3) Supercritical $CO_2$ Extraction Fractionation

A fermentation product is transferred into an extraction kettle with extraction pressure of 30 MPa, a $CO_2$ flow rate of 20 L/h, an extraction temperature of 45° C., and extraction time of 2 h, primary reduced pressure fractionation has pressure of 15 MPa and a temperature of 40° C., secondary reduced pressure fractionation has pressure of 8 MPa and a temperature of 35° C., and prepared nutrition-enhanced functional grease with a good flavor is filled with nitrogen for preservation.

The method of the segmented solid-state fermentation of mixed fungi is used for preparing the grease, an oil yield is 92.3%, the content of unsaturated fatty acids such as linoleic acid, linolenic acid and arachidonic acid is 80.2%, beneficial accompaniments such as vitamin E, tocopherol and phytosterol in the grease are retained to the maximum extent, and the retention rate is 91.0%. The aftertaste of the soybeans and the oil flavor of a rapeseed oil are effectively improved through fermentation, and the relative content of main flavor substances such as pyrazines, alcohols and phenols in the fermented grease is 10.8%.

Embodiment 8

(1) Powder Preparation

After soybeans are crushed and peeled and a blank is rolled, powder is puffed by using a hydraulic conical plug puffing machine with a puffing temperature of 160° C. and puffing time of 2 min, and then cooled to 30° C.; and rapeseeds are peeled and crushed into 50 meshes, autoclaved at 121° C. for 15 min, and cooled to 30° C.

(2) Mixed Fungus Fermentation

The puffed soybean powder and the rapeseed powder subjected to autoclaving are mixed at a ratio of 3:2 (W/W), and transferred into a fermentation tank, moisture content is adjusted to be 30 wt %, 5 wt % of glucose is added, 0.2 wt % of NaCl is added, pH is adjusted to be 6.2, a dissolved oxygen amount is adjusted to be 30% of a total material volume, and *Candida albicans* is inoculated into the fermentation tank with an inoculating amount of 8%, a fermentation temperature of 30° C. and fermentation time of 4 d; and the fermentation temperature is reduced to be 28° C. after 4 d, 3 wt % of glucose is replenished, the dissolved oxygen amount is adjusted to be 20% of the total material volume, the pH is adjusted to be 5.8, and *Rhodosporidium toruloides* and *Rhodotorula glutinis* are mixed and inoculated into the fermentation tank at a ratio of 1:1 with a total inoculating amount of 10%, the fermentation temperature of 28° C. and the fermentation time of 3 d.

(3) Supercritical $CO_2$ Extraction Fractionation

A fermentation product is transferred into an extraction kettle with extraction pressure of 30 MPa, a $CO_2$ flow rate of 15 L/h, an extraction temperature of 40° C., and extraction time of 1.5 h, primary reduced pressure fractionation has pressure of 10 MPa and a temperature of 40° C., secondary reduced pressure fractionation has pressure of 8 MPa and a temperature of 35° C., and prepared nutrition-enhanced functional grease with a good flavor is filled with nitrogen for preservation.

The method of the segmented solid-state fermentation of mixed fungi is used for preparing the grease, an oil yield is 96.1%, beneficial accompaniments such as vitamin E, tocopherol and phytosterol in the grease are retained to the maximum extent, the retention rate is 84.1%, the beany flavor of a soybean oil and the oil flavor of a rapeseed oil are effectively improved through yeast fermentation, the relative content of main flavor substances such as pyrazines, alcohols and phenols in the fermented grease is 12.3%, and the fermented grease is dark red.

Comparative Example 1

Aspergillus oryzae is used alone for fermentation, and the fermentation process is as follows: the Aspergillus oryzae is added into a fermentation tank with a total inoculating amount of 20% (W), segmented fermentation is performed, pH is 5.0, a fermentation temperature is 35° C., aeration fermentation is performed, total fermentation time is 7 d, the remaining steps and conditions are the same as the fermentation conditions of Embodiment 1, at the moment, an oil yield is 74.2%, the content of unsaturated fatty acids is 64.5%, the retention rate of beneficial accompaniments such as vitamin E, tocopherol and phytosterol in grease is 76.3%, and the relative content of main flavor substances such as pyrazines, alcohols and phenols is 7.3%.

Similarly, Aspergillus niger is used alone for fermentation, and the fermentation process is as follows: the Aspergillus niger is added into the fermentation tank with a total inoculating amount of 20% (W), segmented fermentation is performed, pH is natural, a fermentation temperature is 28° C., aeration fermentation is performed, total fermentation time is 7 d, the remaining steps and conditions are the same as the fermentation conditions of Embodiment 1, at the moment, an oil yield is 73.3%, the content of unsaturated fatty acids is 62.8%, the retention rate of beneficial accompaniments such as vitamin E, tocopherol and phytosterol in grease is 59.6%, and the relative content of main flavor substances such as pyrazines, alcohols and phenols is 6.4%.

Similarly, Mortierella isabellina is used alone for fermentation, and the fermentation process is as follows: the Mortierella isabellina is added into the fermentation tank with a total inoculating amount of 20% (W), pH is natural, a fermentation temperature is 28° C., aeration fermentation is performed, total fermentation time is 7 d, the remaining steps and conditions are the same as the fermentation conditions of Embodiment 1, at the moment, an oil yield is 78.6%, the content of unsaturated fatty acids is 68.1%, the retention rate of beneficial accompaniments such as vitamin E, tocopherol and phytosterol in grease is 70.2%, and the relative content of main flavor substances such as pyrazines, alcohols and phenols is 8.1%.

The Aspergillus oryzae, the Aspergillus niger and the Mortierella isabellina are used for fermentation separately, the strain activity is greatly reduced after 3-4 d of fermentation, and a fermentation substrate is not fully utilized. If a carbon source and a strain are not supplemented in time, the fermentation oil extraction efficiency is reduced. Through multi-strain mixed segmented fermentation, an oil yield can be obviously improved by about 16%-25%; in addition, segmental fermentation of mixed fungi of the disclosure can give full play to the synergistic conversion capability of each strain to fatty acids, and improve the content of unsaturated fatty acids in the grease by about 17%-25%; by utilizing a method of multi-strain segmented solid-state fermentation combined with supercritical carbon dioxide extraction, the retention rate of beneficial accompaniments in the grease can be improved by 17-25%; and in addition, the method can remarkably increase the content of main flavor substances such as pyrazines, phenols, alcohols and acids in the grease, and obviously improve the aftertaste of soybean oil products.

Comparative Example 2

Rhodotorula glutinis is used alone for fermentation, and the fermentation process is as follows: the Rhodotorula glutinis is added into a fermentation tank with a total inoculating amount of 20% (W), pH is 6.2, a fermentation temperature is 30° C., aeration fermentation is performed, total fermentation time is 7 d, the remaining steps and conditions are the same as the fermentation conditions of Embodiment 2, at the moment, an oil yield is 78.5%, the retention rate of beneficial accompaniments such as vitamin E, tocopherol and phytosterol in grease is 67.9%, and the relative content of main flavor substances such as pyrazines, alcohols and phenols is 14.5%.

Candida albicans is used alone for fermentation, and the fermentation process is as follows: the Candida albicans is added into the fermentation tank with a total inoculating amount of 20% (W), pH is 6.0, a fermentation temperature is 30° C., aeration fermentation is performed, total fermentation time is 7 d, the remaining steps and conditions are the same as the fermentation conditions of Embodiment 2, at the moment, an oil yield is 80.2%, the retention rate of beneficial accompaniments such as vitamin E, tocopherol and phytosterol in grease is 80.4%, and the relative content of main flavor substances such as pyrazines, alcohols and phenols is 13.9%.

Rhodosporidium toruloides is used alone for fermentation, and the fermentation process is as follows: the Rhodosporidium toruloides is added into the fermentation tank with a total inoculating amount of 20% (W), pH is 6.0, a fermentation temperature is 30° C., aeration fermentation is performed, total fermentation time is 7 d, the remaining steps and conditions are the same as the fermentation conditions of Embodiment 2, at the moment, an oil yield is 77.9%, the retention rate of beneficial accompaniments such as vitamin E, tocopherol and phytosterol in grease is 73.8%, and the relative content of main flavor substances such as pyrazines, alcohols and phenols is 13.4%.

As can be seen, complete fermentation cannot be achieved by using single yeast for fermentation, and strains can lose activity after fermentation for a period of time. By comparison, the method of the disclosure can keep the continuous activity of the strains through a method of multi-strain mixed segmented fermentation combined with supercritical carbon dioxide extraction, the oil yield can be obviously increased by about 18-20%, and the content of beneficial accompaniments such as vitamin E, sterol, triterpene and flavonoid can be increased by 22-33% to a certain extent; and the content of main flavor substances such as pyrazines, alcohols, phenols and acids in the grease is greatly increased.

Comparative Example 3

Firstly, Aspergillus niger and Mortierella isabellina are added for fermentation in a solid state, then Aspergillus oryzae is added for fermentation, the remaining steps and conditions are the same as the fermentation conditions of Embodiment 1, at the moment, an oil yield is 86.4%, the content of unsaturated fatty acids is 72.3%, and the relative content of main flavor substances such as pyrazines, alcohols and phenols is 16.3%. By changing an adding sequence of the three kinds of mold, the oil yield is reduced, particularly, the content of the main flavor substances is obviously reduced, and only about 50% of that in Embodiment 1; and in addition, after the fermentation sequence is changed, when the Aspergillus oryzae is inoculated, a fermentation pH value needs to be readjusted, and the labor cost is increased.

Comparative Example 4

Firstly, Rhodotorula glutinis and Rhodosporidium toruloides are added for fermentation in a solid state, then

*Candida albicans* is added for fermentation, the remaining steps and conditions are the same as the fermentation conditions of Embodiment 2, at the moment, an oil yield is 87.3%, the content of unsaturated fatty acids is 70.6%, and the relative content of main flavor substances such as pyrazines, alcohols and phenols is 18.6%; and in addition, after a fermentation sequence is changed, the color of grease obtained by fermentation is less bright than that of grease prepared according to Embodiment 2.

Comparative Example 5

If a ratio of soybeans to other oil seeds is 2:3, solid-state fermentation is carried out by using the methods of Embodiments 1 and 2, and at the moment, oil yields are 86.3% and 87.5% respectively. Increasing the amount of other oil seeds will increase the cost of raw materials to some extent. In addition, a flaxseed oil, a hemp oil, a peanut oil and other oils have strong flavors themselves, when the content is relatively large, the aftertaste of the soybean oil can be well covered up without fermentation, and the cost can be further increased if fermentation is used for oil extraction again; and besides, the flaxseed oil, the hemp oil, a rapeseed oil and the like contain a large amount of unsaturated fatty acids and contain main substances such as pyrazines which generate flavors, if the proportion of these oils is increased, the content of 2-pentylpyridine in grease may be increased, and unpleasant smell is easily generated.

Although the disclosure has been disclosed above in terms of exemplary embodiments, it is not intended to limit the disclosure, and various changes and modifications may be made by those skilled in the art without departing from the spirit and scope of the disclosure, so the protection scope of the disclosure should be defined in the appended claims.

What is claimed is:

1. A method for preparing functional grease through segmented solid-state fermentation of mixed fungi, comprising the following steps:
    (1) powder preparation: after crushing and peeling soybeans, rolling a blank, performing puffing by using a hydraulic conical plug puffing machine at a puffing temperature of 150-160° C. for the puffing time of 1-3 min, and then cooling to 25-35° C. to obtain soybean powder; and husking or peeling other oil seeds, crushing into 50-100 meshes, autoclaving crushed powder at 115-121° C. for 15-30 min, and cooling to 25-35° C. to obtain other oil seed powder;
    (2) fungus fermentation: mixing the puffed soybean powder and the other oil seed powder subjected to autoclaving at a mass ratio of 6-9:1-4, putting a mixture into a fermentation tank, adjusting moisture content of materials in the fermentation tank to be 20-30 wt %, adding 0.5-5 wt % of glucose, adding 0.05-0.5 wt % of NaCl, adjusting pH to be 3.5-9, inoculating 10-20 wt % of fungal strains, and performing segmented fermentation at a fermentation temperature of 25-35° C. for the total fermentation time of 3-7 days, wherein the fungi are mold or yeast, the mold comprises *Aspergillus oryzae*, *Aspergillus niger* and *Mortierella isabellina*, and the yeast comprises *Rhodotorula glutinis*, *Candida albicans* and *Rhodosporidium toruloides*; and
    (3) supercritical $CO_2$ extraction fractionation: transferring a fermentation product into an extraction kettle, performing supercritical $CO_2$ extraction, then performing reduced pressure fractionation to prepare nutrition-enhanced grease with different flavors and colors, and filling the grease with nitrogen so as to preserve the grease,
    wherein the segmented fermentation is as follows: when the fungi are the mold, the pH is adjusted to be 3.5-9, a dissolved oxygen amount is adjusted to be 30%-40% of a total material volume, firstly the *Aspergillus oryzae* is added for fermentation for 1-3 days, then 0.1 wt %-1 wt % of glucose is replenished, the pH is adjusted to be 3.5-9, the dissolved oxygen amount is adjusted to be 30%-40% of the total material volume, and then the *Aspergillus niger* and the *Mortierella isabellina* are added for culture for 2-6 days; or, when the fungi are the yeast, the pH is adjusted to be 5-9, the dissolved oxygen amount is adjusted to be 25%-35% of the total material volume, firstly the *Candida albicans* or the *Candida albicans* and the *Rhodosporidium toruloides* are added for fermentation for 2-5 days, then 1 wt %-3 wt % of glucose is replenished, the pH is adjusted to be 5-9, the dissolved oxygen amount is adjusted to be 10%-20% of the total material volume, and then the *Rhodotorula glutinis* and the *Rhodosporidium toruloides* or the *Rhodotorula glutinis* is added for fermentation for 1-4 days.

2. The method according to claim 1, wherein the other oil seeds are any one or more of flaxseeds, hemp seeds, rapeseeds, sesame, peanuts and corn germs.

3. The method according to claim 1, wherein the mass ratio of the soybean powder to the other oil seed powder is 6-9:1-4.

4. The method according to claim 1, wherein a mass ratio of the *Aspergillus oryzae* to the *Aspergillus niger* to the *Mortierella isabellina* is 1-5:1-5:1-5.

5. The method according to claim 1, wherein a mass ratio of the *Rhodotorula glutinis* to the *Candida albicans* to the *Rhodosporidium toruloides* is 1-5:1-5:1-5.

6. The method according to claim 1, wherein an extraction pressure is 30-40 MPa, a $CO_2$ flow rate is 15-20 L/h, an extraction temperature is 40-50° C., and the extraction time is 1.5-2 h.

7. The method according to claim 1, wherein the reduced pressure fractionation is divided into primary reduced pressure fractionation and secondary reduced pressure fractionation, the primary reduced pressure fractionation has a pressure of 10-20 MPa and a temperature of 40-50° C., and the secondary reduced pressure fractionation has a pressure of 8-10 MPa and a temperature of 35-45° C.

8. The method according to claim 1, wherein the (1) powder preparation comprises the following steps: after crushing and peeling the soybeans and rolling the blank, puffing the powder by using the hydraulic conical plug puffing machine at the puffing temperature of 150° C. for the puffing time of 2 min, and then cooling to 35° C.; and crushing flaxseeds into 100 meshes, performing autoclaving at 121° C. for 15 min, and cooling to 28° C.;
    the (2) fungus fermentation comprises the following steps: mixing the puffed soybean powder and the flaxseed powder subjected to autoclaving at the mass ratio of 8:2, transferring the mixture into the fermentation tank, adjusting the moisture content to be 20 wt %, adding 1 wt % of the glucose, adding 0.05 wt % of the NaCl, adjusting the pH to be about 5.0, and adjusting the dissolved oxygen amount to be 30% of the total material volume; adding the *Aspergillus oryzae* into the fermentation tank with an inoculating amount of 10%, the fermentation temperature of 35° C. and the fermentation time of 2 days; and reducing the temperature in the fermentation tank to be 28° C. after 2 days, replenishing 0.5 wt % of glucose, and mixing and adding the *Aspergillus niger* and the *Mortierella isabellina* into the fermentation tank at a ratio of 1:1 with a total inoculating amount of 10%, the dissolved oxygen amount of 40% of the total material volume, the fermentation temperature of 28° C. and the fermentation time of 5 days; and the (3) supercritical $CO_2$ extraction fractionation comprises the following steps: transferring the fermentation product into the extraction kettle with an extraction pressure of 30 MPa, a $CO_2$ flow rate of 15 L/h, an extraction temperature of 45° C., and the extraction time of 2 h, then performing reduced pressure fractionation comprising primary reduced pressure fractionation with a pressure of 15 MPa and a temperature of 40° C. and secondary reduced pressure fractionation with a pressure of 8 MPa and a temperature of 35° C., and filling the prepared nutrition-enhanced functional grease with the nitrogen so as to preserve the grease.

9. The method according to claim 1, wherein the (1) powder preparation comprises the following steps: after crushing and peeling the soybeans and rolling the blank, puffing the powder by using the hydraulic conical plug puffing machine at the puffing temperature of 160° C. for the puffing time of 2 min, and then cooling to 30° C.; and crushing flaxseeds into 100 meshes, performing autoclaving at 121° C. for 15 min, and cooling to 30° C.;

the (2) fungus fermentation comprises the following steps: mixing the puffed soybean powder and the flaxseed powder subjected to autoclaving at the mass ratio of 8:2, transferring the mixture into the fermentation tank, adjusting the moisture content to be 20 wt %, adding 5 wt % of the glucose, adding 0.1 wt % of the NaCl, adjusting the pH to be 6.2, adjusting the dissolved oxygen amount to be 30% of the total material volume, and mixing and inoculating the *Candida albicans* and the *Rhodosporidium toruloides* into the fermentation tank at a ratio of 1:1 with an inoculating amount of 10%, the fermentation temperature of 30° C. and the fermentation time of 3 days; and reducing the fermentation temperature to be 28° C. after 3 days, replenishing 2 wt % of glucose, adjusting the dissolved oxygen amount to be 15% of the total material volume, adjusting the pH to be 6.0, and inoculating 10% of the *Rhodotorula glutinis* at the fermentation temperature of 28° C. for the fermentation time of 4 days; and the (3) supercritical $CO_2$ extraction fractionation comprises the following steps: transferring the fermentation product into the extraction kettle with an extraction pressure of 30 MPa, a $CO_2$ flow rate of 15 L/h, an extraction temperature of 40° C., and the extraction time of 1.5 h, performing primary reduced pressure fractionation with a pressure of 10 MPa and a temperature of 40° C. and secondary reduced pressure fractionation with a pressure of 8 MPa and a temperature of 35° C., and filling the prepared functional grease with different flavors and colors with the nitrogen so as to preserve the grease.

10. The method according to claim 1, wherein the (1) powder preparation comprises the following steps: after crushing and peeling the soybeans and rolling the blank, puffing the powder by using the hydraulic conical plug puffing machine at the puffing temperature of 160° C. for the puffing time of 1 min, and then cooling to 35° C.; and hulling and crushing hemp seeds into 100 meshes, performing autoclaving at 121° C. for 15 min, and cooling to 35° C.;

the (2) fungus fermentation comprises the following steps: mixing the puffed soybean powder and the hemp seed powder subjected to autoclaving at the mass ratio of 9:1, transferring the mixture into the fermentation tank, adjusting the moisture content to be 25 wt %, adding 5 wt % of the glucose, adding 0.05 wt % of the NaCl, adjusting the pH to be about 5.0, and adjusting the dissolved oxygen amount to be 40% of the total material volume; adding the *Aspergillus oryzae* into the fermentation tank with an inoculating amount of 8%, the fermentation temperature of 35° C. and the fermentation time of 2 days; and reducing the temperature in the fermentation tank to be 28° C. after 2 days, replenishing 0.1 wt % of glucose, and mixing and adding the *Aspergillus niger* and the *Mortierella isabellina* into the fermentation tank at a ratio of 1:3 with a total inoculating amount of 8%, the dissolved oxygen amount of 30% of the total material volume, the fermentation temperature of 28° C. and the fermentation time of 5 days; and the (3) supercritical $CO_2$ extraction fractionation comprises the following steps: transferring the fermentation product into the extraction kettle with an extraction pressure of 40 MPa, a $CO_2$ flow rate of 20 L/h, an extraction temperature of 50° C., and the extraction time of 2 h, performing primary reduced pressure fractionation with a pressure of 20 MPa and a temperature of 50° C. and secondary reduced pressure fractionation with a pressure of 10 MPa and a temperature of 45° C., and filling the prepared nutrition-enhanced functional grease with a good flavor with the nitrogen so as to preserve the grease.

11. The method according to claim 1, wherein the (1) powder preparation comprises the following steps: after crushing and peeling the soybeans and rolling the blank, puffing the powder by using the hydraulic conical plug puffing machine at the puffing temperature of 160° C. for the puffing time of 1 min, and then cooling to 30° C.; and crushing hemp seeds into 100 meshes, performing autoclaving at 121° C. for 15 min, and cooling to 30° C.;

the (2) fungus fermentation comprises the following steps: mixing the puffed soybean powder and the hemp seed powder subjected to autoclaving at the mass ratio of 9:1, transferring the mixture into the fermentation tank, adjusting the moisture content to be 25 wt %, adding 4 wt % of the glucose, adding 0.2 wt % of the NaCl, adjusting the pH to be 6.2, adjusting the dissolved oxygen amount to be 30% of the total material volume, and mixing and inoculating the *Candida albicans* and the *Rhodosporidium toruloides* into the fermentation tank at a ratio of 1:1 with an inoculating amount of 8%, the fermentation temperature of 30° C. and the fermentation time of 3 days; and reducing the fermentation temperature to be 28° C. after 3 days, replenishing 3 wt % of glucose, adjusting the dissolved oxygen amount to be 10% of the total material volume, adjusting the pH to be 6.0, and inoculating 10% of the *Rhodotorula glutinis* at the fermentation temperature of 28° C. for the fermentation time of 4 days; and the (3) supercritical $CO_2$ extraction fractionation comprises the following steps: transferring the fermentation product into the extraction kettle with an extraction pressure of 35 MPa, a $CO_2$ flow rate of 15 L/h, an extraction temperature of 45° C., and the extraction time of 2 h, performing primary reduced pressure fractionation with a pressure of 20 MPa and a temperature of 40° C. and secondary reduced pressure fractionation with a pressure of 8 MPa and a temperature of 40° C., and filling the prepared nutrition-enhanced functional grease with different flavors and colors with the nitrogen so as to preserve the grease.

12. The method according to claim 1, wherein the (1) powder preparation comprises the following steps: after crushing and peeling the soybeans and rolling the blank, puffing the powder by using the hydraulic conical plug puffing machine at the puffing temperature of 150° C. for the puffing time of 3 min, and then cooling to 35° C.; and peeling and crushing peanuts into 150 meshes, performing autoclaving at 115° C. for 30 min, and cooling to 35° C.;
the (2) fungus fermentation comprises the following steps: mixing the puffed soybean powder and the peanut powder subjected to autoclaving at the mass ratio of 8:2, transferring the mixture into the fermentation tank, adjusting the moisture content to be 30 wt %, adding 3 wt % of the glucose, adding 1 wt % of the NaCl, adjusting the pH to be about 5.0, and adjusting the dissolved oxygen amount to be 40% of the total material volume; adding the *Aspergillus oryzae* into the fermentation tank with an inoculating amount of 8%, the fermentation temperature of 35° C. and the fermentation time of 2 days; and reducing the temperature in the fermentation tank to be 28° C. after 2 days, replenishing 0.1 wt % of glucose, and mixing and adding the *Aspergillus niger* and the *Mortierella isabellina* into the fermentation tank at a ratio of 1:3 with a total inoculating amount of 8%, the dissolved oxygen amount of 30% of the total material volume, the fermentation temperature of 28° C. and the fermentation time of 5 days; and
the (3) supercritical $CO_2$ extraction fractionation comprises the following steps: transferring the fermentation product into the extraction kettle with an extraction pressure of 30 MPa, a $CO_2$ flow rate of 20 L/h, an extraction temperature of 45° C., and the extraction time of 2 h, performing primary reduced pressure fractionation with a pressure of 15 MPa and a temperature of 40° C. and secondary reduced pressure fractionation with a pressure of 8 MPa and a temperature of 35° C., and filling the prepared nutrition-enhanced functional grease with a good flavor with the nitrogen so as to preserve the grease.

13. The method according to claim 1, wherein the (1) powder preparation comprises the following steps: after crushing and peeling the soybeans and rolling the blank, puffing the powder by using the hydraulic conical plug puffing machine at the puffing temperature of 150° C. for the puffing time of 3 min, and then cooling to 28° C.; and peeling and crushing peanuts into 150 meshes, performing autoclaving at 115° C. for 30 min, and cooling to 30° C.;
the (2) fungus fermentation comprises the following steps: mixing the puffed soybean powder and the peanut powder subjected to autoclaving at the mass ratio of 8:2, transferring the mixture into the fermentation tank, adjusting the moisture content to be 25 wt %, adding 5 wt % of the glucose, adding 0.2 wt % of the NaCl, adjusting the pH to be 6.2, adjusting the dissolved oxygen amount to be 30% of the total material volume, and inoculating the *Candida albicans* into the fermentation tank with an inoculating amount of 8%, the fermentation temperature of 30° C. and the fermentation time of 4 days; and reducing the fermentation temperature to be 28° C. after 4 days, replenishing 3 wt % of glucose, adjusting the dissolved oxygen amount to be 20% of the total material volume, adjusting the pH to be 5.8, and mixing and inoculating the *Rhodosporidium toruloides* and the *Rhodotorula glutinis* into the fermentation tank at a ratio of 1:1 with a total inoculating amount of 10%, the fermentation temperature of 28° C. and the fermentation time of 3 days; and
the (3) supercritical $CO_2$ extraction fractionation comprises the following steps: transferring the fermentation product into the extraction kettle with an extraction pressure of 30 MPa, a $CO_2$ flow rate of 15 L/h, an extraction temperature of 40° C., and the extraction time of 1.5 h, performing primary reduced pressure fractionation with a pressure of 10 MPa and a temperature of 40° C. and secondary reduced pressure fractionation with a pressure of 8 MPa and a temperature of 35° C., and filling the prepared nutrition-enhanced functional grease with a good flavor and color with the nitrogen so as to preserve the grease.

14. The method according to claim 1, wherein the (1) powder preparation comprises the following steps: after crushing and peeling the soybeans and rolling the blank, puffing the powder by using the hydraulic conical plug puffing machine at the puffing temperature of 160° C. for the puffing time of 2 min, and then cooling to 28° C.; and peeling and crushing rapeseeds into 50 meshes, performing autoclaving at 121° C. for 15 min, and cooling to 28° C.;
the mixed fungus fermentation comprises the following steps: mixing the puffed soybean powder and the rapeseed powder subjected to autoclaving at the mass ratio of 3:2, transferring the mixture into the fermentation tank, adjusting the moisture content to be 25 wt %, adding 1 wt % of the glucose, adding 0.05 wt % of the NaCl, adjusting the pH to be about 5.0, and adjusting the dissolved oxygen amount to be 30% of the total material volume; adding the *Aspergillus oryzae* into the fermentation tank with an inoculating amount of 10%, the fermentation temperature of 35° C. and the fermentation time of 2 days; and reducing the temperature in the fermentation tank to be 28° C. after 2 days, replenishing 0.5 wt % of glucose, and mixing and adding the *Aspergillus niger* and the *Mortierella isabellina* into the fermentation tank at a ratio of 1:1 with a total inoculating amount of 10%, the dissolved oxygen amount of 40% of the total material volume, the fermentation temperature of 28° C. and the fermentation time of 5 d; and
the (3) supercritical $CO_2$ extraction fractionation comprises the following steps: transferring the fermentation product into the extraction kettle with an extraction pressure of 30 MPa, a $CO_2$ flow rate of 20 L/h, an extraction temperature of 45° C., and the extraction time of 2 h, performing primary reduced pressure fractionation with a pressure of 15 MPa and a temperature of 40° C. and secondary reduced pressure fractionation with a pressure of 8 MPa and a temperature of 35° C., and filling the prepared nutrition-enhanced functional grease with a good flavor with the nitrogen so as to preserve the grease.

15. The method according to claim 1, wherein the (1) powder preparation comprises the following steps: after crushing and peeling the soybeans and rolling the blank, puffing the powder by using the hydraulic conical plug puffing machine at the puffing temperature of 160° C. for the puffing time of 2 min, and then cooling to 30° C.; and peeling and crushing rapeseeds into 50 meshes, performing autoclaving at 121° C. for 15 min, and cooling to 30° C.;

the (2) fungus fermentation comprises the following steps: mixing the puffed soybean powder and the rapeseed powder subjected to autoclaving at the mass ratio of 3:2, transferring the mixture into the fermentation tank, adjusting the moisture content to be 30 wt %, adding 5 wt % of the glucose, adding 0.2 wt % of the NaCl, adjusting the pH to be 6.2, adjusting the dissolved oxygen amount to be 30% of the total material volume, and inoculating the *Candida albicans* into the fermentation tank with an inoculating amount of 8%, the fermentation temperature of 30° C. and the fermentation time of 4 days; and reducing the fermentation temperature to be 28° C. after 4 days, replenishing 3 wt % of glucose, adjusting the dissolved oxygen amount to be 20% of the total material volume, adjusting the pH to be 5.8, and mixing and inoculating the *Rhodosporidium toruloides* and the *Rhodotorula glutinis* into the fermentation tank at a ratio of 1:1 with a total inoculating amount of 10%, the fermentation temperature of 28° C. and the fermentation time of 3 days; and the (3) supercritical $CO_2$ extraction fractionation comprises the following steps: transferring the fermentation product into the extraction kettle with an extraction pressure of 30 MPa, a $CO_2$ flow rate of 15 L/h, an extraction temperature of 40° C., and the extraction time of 1.5 h, performing primary reduced pressure fractionation with pressure of 10 MPa and a temperature of 40° C. and secondary reduced pressure fractionation with pressure of 8 MPa and a temperature of 35° C., and filling the prepared nutrition-enhanced functional grease with a good flavor with the nitrogen so as to preserve the grease.

16. Grease prepared by the method according to claim 1.

17. Food or edible oil comprising the grease according to claim 16.

* * * * *